United States Patent Office 2,790,721
Patented Apr. 30, 1957

2,790,721

METHOD OF PRESERVING FOOD PRODUCTS

Harry A. Toulmin, Jr., Dayton, Ohio, assignor to The Commonwealth Engineering Company of Ohio, Dayton, Ohio, a corporation of Ohio No Drawing. Application January 26, 1953,
Serial No. 333,337

2 Claims. (Cl. 99—150)

This invention relates to the protection and preservation of foods.

In the food-packaging art the encasement of foods in films or casings is well known. Natural casings made from animal intestines are widely used, but suffer from the disadvantage that they are tough and often difficult to remove from the food product. Artificial casings made from regenerated cellulose are also widely employed but also possess the disadvantage of being tough and inedible.

It is also known to provide articles of food, such as fruits or vegetables normally or naturally provided with a skin, with a coating of a wax applied in solution or dispersion in a volatile solvent. The use of the wax preparations has the disadvantages that the solvent often imparts an undesirable odor to the food, tends to weaken the skin or peel, sometimes results in burned or pitted fruit and may be regarded as dangerous because explosive.

Other materials have been proposed for the present purpose but have drawbacks of one kind or another. For instance, their adhesive strength may be substantially greater than their cohesive strength so that if a bactericidal agent is incorporated with the coating material and renders the coating inedible, the coating cannot be stripped off clean before the food is eaten but has to be picked off in fragments. This is a drawback of gelatin for use as a protective coating for hams and the like.

In general, also, the materials previously proposed for this use have the drawback that they do not retard loss of moisture from the foodstuff while permitting gradual diffusion of gases from the foodstuff to the surrounding atmosphere. This is a problem which arises in the packaging of many foodstuffs and particularly in the packaging of meat products such as sausage.

The fresh appearance of the meat, and maintenance of its original dimensions and weight, depend on retention of moisture by the meat between the time of its preparation for market and consumption thereof. However, during such period, the slow decomposition which inevitably takes place results in the evolution of gases. Therefore, it is desirable to provide such products with a protective coating or casing of a material which both prevents or retards escape of moisture from the food to the ambient atmosphere so that shrinkage and loss of weight thereof are reduced to a minimum, and permits the gradual diffusion of evolved gases through the casing or coating to the atmosphere whereby the accumulation of the gas in the form of pockets under the casing, and the acquisition of an unsightly appearance by the coated or encased food product, are avoided.

In the past, attempts have been made to establish a balance between retention of moisture by the food product and escape of the evolved gases by providing the product with an inedible coating comprising a mixture of substances of different properties, for example different degrees of hygroscopicity, or by treating sausage or the like having an inedible regenerated cellulose casing with synthetic resins. Thus, while the materials proposed previously for encasing or coating food products may have satisfied one or more of the requirements for a protective substance for foodstuffs, none of them has met all the requirements for a wholly satisfactory, versatile, variously useful substance for that use.

The primary object of this invention is to provide various foods with a casing or surface coating which retards decay, inhibits growth of molds and bacterial contamination from without, retards development of undesirable changes resulting from oxidative processes, and prevents or minimizes loss of natural moisture from the food while permitting gradual diffusion of decomposition gases therefrom.

It has been found, in accordance with this invention, that dextran and certain dextran derivatives are particularly well adapted to use as protective coatings or casings for foods in that they provide the food with a comparatively inexpensive, smooth, strongly adhesive, coherent and transparent protective covering which is resistant to abrasion, inhibits deterioration of the food by microbial action, e. g., by fungus or bacterial growth, and retards loss of moisture while permitting the protected product to "breathe."

Dextran is a polysaccharide which is produced by the action of selected bacteria on sucrose-bearing nutrient media and which has been shown to be of unique chemical structure in that, although it is made up of anhydroglucose residues, these residues are not all linked together in straight-chain fashion, as in cellulose, for instance, but are arranged in a branched-type structure, the dextran molecule being made up of units, each consisting of a chain of four anhydroglucose residues joined uniformly by glucosidic linkages between the first and sixth carbon atoms of contiguous hexose units and each such unit carrying a side group or chain consisting of one anhydroglucose residue.

The dextran may be produced by inoculating a nutrient medium containing sucrose, nitrogeneous compounds and various salts with suitable bacteria, such as *Leuconostoc mesenteroides* or *L. dextranicum*.

The culture media employed must contain some sucrose, which may be either refined or crude, or a sucrose-containing material such as molasses. Nitrogen may be added in the form of commercial peptone, beef extract or other nitrogen-containing substance. If molasses is used as the sucrose source, the quantity of nitrogeneous compounds present therein may be sufficient for cultivation of the bacteria and the addition of extraneous nitrogen sources may not be required. The salts added to the nutrient media may be, for example, such salts as dipotassium phosphate and sodium chloride. As a specific example, a typical medium may contain: sucrose, 5–10%; peptone, 0.1%; dipotassium phosphate, 0.2%; and sodium chloride, 0.1%. The pH of the medium preferably is adjusted to slightly on the alkaline side of neutrality.

The production of the dextran is favored by keeping the reaction of the nutrient medium slightly alkaline throughout the period of fermentation, which may be accomplished by using an excess of calcium carbonate in the medium. After inoculation, the cultures are incubated at the temperature most favorable to the growth of the microorganism. Illustatively, for *Leuconostoc mesenteroides*, the best incubation temperature is around 25° C. The progress of the fermentation may be followed by periodically removing samples of the fermenting culture medium and precipitating the dextran contained in them by the addition of three to five times their volume of alcohol. The precipitated dextran may then be weighed and when a maximum of dextran has been formed the dextran, with or without hydrolysis thereof to a product of lower molecular weight, may be separated from the fermented medium and purified or converted to a derivative which is separated and purified. The time required for maximum dextran production is variable, depending on the microorganism and other factors, including concentration of sucrose, the temperature of the incubation, etc.

Determinations of the mean molecular weight of the dextran obtained by the microbiological method described above have demonstrated that the product is of very high molecular weight which may be considered to be several millions. This high molecular weight product may be isolated by precipitating it out of the culture medium, for example, by means of alcohol or acetone, as a plastic or doughy mass. On drying, the precipitate solidifies to a hard, brittle mass which may be subdivided to a fine powder by grinding.

If the high molecular weight product formed initially is to be used as such in practicing the present invention, it may be isolated from the fermented culture medium by adjusting the pH of the fermented solution to the neutral point, concentrating the solution under reduced pressure at a temperature of 40 to 50° C. to approximately one-fourth of its original volume, and pouring the concentrated solution, with stirring, into three to five times its volume of alcohol or acetone to precipitate the dextran.

The high molecular weight dextran may be water-soluble or relatively water-insoluble depending on the conditions of its production, including the microorganism used, and the ratio of alpha-1,6- to non-1,6-glucopyranosidic linkages. The product obtained using the bacterium *Leuconostoc mesenteroides* under the conditions described above is generally only partially soluble in water. The plastic mass precipitated from the culture medium may be freed of impurities and triturated with water to produce an aqueous dispersion of the desired viscosity for direct application to the food product, or it may be purified, dried, subdivided, for instance ground to a powder, and the particles mixed with water to obtain the aqueous dispersion.

The dispersion may be applied to the food product by dipping, spraying, or in any other appropriate manner, after which the product may be dried in air, which may be heated, e. g., to 50 to 100° C. to expedite evaporation of the water and convert the gel coating to a strongly adherent, strongly coherent film. More than one application of the dispersion to the product may be made, with intermediate drying between the applications.

Instead of applying the dextran dispersion directly to the food product as a surface coating, the dispersion may be extruded through a film-forming device to form a film which after stretching and drying or stretching concomitantly with drying for increase in tenacity and to produce a relatively thin membrane or pellicle, may be used as a casing for various foods.

For instance, the pre-formed film or pellicle may be fed to a conventional stuffing machine, comprising a stuffing horn, and which may have associated therewith means for overlapping the opposite longitudinal edges of the dextran pellicle, means for rendering the overlapped edges sealable, that is, means for moistening the edges or for depositing an extraneous adhesive therebetween, and means for pressing the edges to seal them. After one end of the casing is tied and the meat stuffed into it, the other end is tied, and, of course, a string of linked, encased products may be made.

These various operations may be performed continuously as will be understood by those versed in the art. The protective film may have any thickness which permits it to be readily conformed to a tube adapted for stuffing or to the contours of the article to be protected.

In applying the dispersion directly to the food product, the proportion of water may be varied considerably according to the porosity and other physical character of the surface of the food product to be treated. When rougher products (i. e., with larger pores), such as citrus fruit or meat are coated, less water is used, thereby making a thicker coating, whereas when smooth products such as eggs are coated, more water may be used, thereby making a thinner coating. The proportion of water used, which determines the viscosity of the dispersion, will also depend on the molecular weight of the dextran. Suitable solutions or dispersions are those containing the dextran or dextran derivative in a concentration of from about 2% by weight to 20% or higher and up to the concentration at which the viscosity of the mass is such that application thereof to the food product becomes impractical.

Instead of using the high molecular weight gelatinous dextran obtained initially, it may be hydrolyzed to a lower molecular weight and this may be preferred when an edible casing or coating is desired. Dextran having a molecular weight between about 5,000 and 100,000 is generally preferred when the casing or coating is to be consumed with the food. The high molecular weight dextran may be hydrolyzed to lower molecular weight in the range indicated by means of acid or enzymatically.

Acid hydrolysis normally results in a product made up of fractions having molecular weights in a comparatively wide range, i. e., the product is not homogeneous with respect to molecular weight. Such a hydrolysis product made up of fractions of varying molecular weight but which is soluble in water and forms solutions having a relatively viscosity (water=1) at a concentration of 4% which may vary between the limits of 1.5 and 15, may be obtained by known methods of hydrolyzing the dextran, with or without isolation thereof from the culture medium, under correlated conditions of acid concentration, time and temperature. The water-soluble hydrolysis product may be precipitated from the medium in which the hydrolysis is performed by means of a non-solvent such as alcohol.

Instead of partially depolymerizing or degrading the dextran by means of acid, the hydrolysis may be accomplished by enzymatic action. For example, the dextran may be hydrolyzed by subjecting it to the action of an endo-dextranase produced by cultivation of a strain of *Aspergillus Wentii* as described in the co-pending application of Virginia Whiteside Carlson and Warner W. Carlson, Serial No. 241,168, filed August 9, 1951. As disclosed in said application, the Aspergillus mold is cultured in a nutrient medium containing a source of amino acids and, optionally, a small, acclimatizing amount of dextran, the culture is filtered, and the filtrate or the endo-dextranase isolated therefrom is introduced into an aqueous medium containing the high molecular weight dextran to be split, and allowed to act on the dextran until partially degraded fragments or segments of the desired lower molecular weight down to about 20,000 are produced. This latter method of hydrolyzing the dextran may be preferred since it results in the production of dextran segments or fractions of substantially uniform molecular weight, which may be predetermined, which fragments, when they have a molecular weight in the range 5,000 to 100,000, are completely water-soluble and particularly well suited to use in providing food products with an edible casing or coating.

Instead of encasing the food product in a dextran pellicle or the like, or providing the product with a dextran coating, various dextran derivatives may be used for this purpose and particularly water-soluble or water-dispersible dextran derivatives. For example, dextran ethers may be used. The preferred dextran ethers are water-soluble or water-dispersible carboxyalkyl dextrans, and particularly carboxymethyl dextran, such as are disclosed in the pending application of Malvern J. Hiler, Serial No. 327,938, filed December 24, 1952.

These ethers may be produced by reacting dextran with the carboxyalkylating agent, such as chloracetic acid, sodium chloracetate or chloracetamide in aqueous alkaline solution, i. e., in an aqueous solution of an alkali metal hydroxide and preferably sodium hydroxide, followed by neutralization of the alkali metal salt of the ether thus produced. The etherification may be performed before or after isolation of the dextran from the culture medium and with or without hydrolysis thereof to a lower molecular weight product.

The ethers may be handled in the same manner as the dextran itself, i. e., they may be mixed with water and formed into films or pellicles to be used as casings for various food products, or the aqueous solution or dispersion may be applied directly to food products by dipping or spraying. The alkali metal salts of the ethers may be used, if desired, but generally are not presently preferred.

Instead of dextran or the dextran ethers, the food product may be provided with a protective film or coating of a dextran salt, for example calcium dextranate, which, as disclosed in the pending application of M. D. Ford and L. J. Novak, Serial No. 281,505, filed April 10, 1952, may be produced by reacting dextran with a calcium alcoholate, e. g., calcium methylate, and may be water-soluble or water-dispersible, and after purification occurs as a white powder. The powder may be dissolved or dispersed in water and formed into a film or used to provide the food product with a coating by dip or spray methods. Other metal salts of dextran, including alkali metal salts such as sodium dextranate may be similarly prepared and used.

Dextran esters, notably organic acid esters such as the dextran acetate disclosed in U. S. No. 2,386,994, may be used, also.

In preparing aqueous dispersions of the dextran derivatives, there may be used various dispersing assistants.

The dextrans used in practicing the invention are more or less hygroscopic and are also characterized by pronounced adhesiveness coupled with appreciable cohesive strength. Because of their hygroscopicity, the dextran films or coatings are effective in retarding the escape of natural moisture from food products protected thereby and thus in preventing shrinkage and loss of weight of the product, and in preserving the fresh appearance thereof. At the same time, the dextran film or coating permits a certain amount of "breathing" of the product, that is, the gradual exchange of gases such as $CO_2$ and oxygen between the protected product and the ambient atmosphere, so that gases which may be given off by the product do not accumulate under the film or coating. Thus, dextran accomplishes objectives hitherto achieved by providing various food products with coatings comprising a plurality of substances, one hygroscopic, the other adhesive.

If the food product is of the type which is normally processed by heating after it is encased in the protective film, for example, if it is a stuffed product like sausage, and the film is water-soluble, the encased product may be dry-heat processed without detriment to the casing.

If the casing or protective film is inedible or it is desired to remove it from the food product before the latter is eaten, it may be peeled or stripped off the product, the cohesive strength being such that clean stripping or peeling is readily accomplished. Or the film may be removed by simply washing the product with hot, or even cold, water, preferably with the use of a brush or other stripping device.

Generally speaking, the use of extraneous plasticizing agents is not required, but for some purposes the presence of a plasticizer in the film or coating may be desirable. If so, a plasticizer may be incorporated in the aqueous plastic mass comprising dextran or the dextran derivative before it is formed into a film or applied to the food product. Plasticizers which may be used, for example in amounts between about 2% and 20% by weight, include tartaric acid, glycol, glycerine, ethylene glycol monoethyl ether, methylene glycol monoethyl ether, and so forth.

While it is preferred to provide the food product with a protective film or coating consisting essentially of dextran, a dextran derivative or a mixture of dextran and a dextran derivative, and the presence of other film-forming components is not required to the accomplishment of the objects of this invention, other film-forming materials, such as methyl cellulose, ethyl cellulose, carboxymethyl cellulose or its alkali metal or ammonium salts, may be blended with the dextran or dextran derivative in amounts from 5% up to about 15% on the combined weight of the dextran or dextran derivative and the added film-former. Various elastomers and film-forming resins may also be blended with the dextran or dextran derivative in small amounts, between, say, 2% and 10% by weight, for special purposes.

Various other water-soluble or water-dispersible materials may be incorporated in the plastic mass comprising dextran or the dextran derivative to impart desired special characteristics to the protective film or coating. Dyes or pigments may be mixed with the mass. For example, a red film may be obtained by distributing a small quantity of F, D & C Red #1 uniformly through the aqueous mass before forming it into a film or applying it to the food product as a coating. Although dextran has immunological properties and does not normally support bacterial life or mold growth (it has been found to precipitate various bacteria when admixed therewith), special bactericidal and mold-inhibiting agents may be included in the viscous solution or dispersion. Thus, there may be included in the mass a small amount, for instance 0.1% to 0.5% by weight of a mold inhibitor of the type of parahydroxybenzoate, sodium parahydroxybenzoate, sodium benzoate, ethyl vanillate, and so forth.

The dextran and dextran derivative film or coating is essentially tasteless and odorless. Flavoring materials may be added to the aqueous mass comprising them to impart a distinct odor and/or taste to the film or coating. For instance, a small amount of monosodium glutamate, meat extract or protein hydrolysate may be added to the mass comprising the dextran or dextran derivative to impart a meat flavor to the film or coating. Other flavoring material, such as salt, fruit essences or extracts, spices, condiments and so forth may be added, the selection of the additive being controlled by the kind of food to be protected. Special anti-oxidants may be mixed with the mass in amounts between 0.1% and 2% by weight and including such substances as ascorbic acid; butylated hydroxyanisole; gallic acid; N- tetra- (carboxymethyl) ethylene diamine and its salts; dilauryl thiodipropionate; etc.

When the film or coating is to be consumed with the food product, it may be used to add vitamins or other nutrition supplements or aids to the food by including in the plastic or viscous mass or in the coating composition, B vitamins such as thiamin, niacin, pantothenic acid, B-12, etc., minerals or mineral salts such as ferric phosphate, etc. It will be apparent that the film-forming mass or coating composition may be fortified or modified in various ways to provide the food product to be protected with a casing or coating of predetermined properties from the standpoint of color, preservative action, increased nutrition or taste appeal, etc.

When the food product to be protected has a water-repellent surface or skin, it may be desirable to incorporate a surface active agent in the film-forming or coating composition to facilitate adherence of the film to the product, although the inherent adhesiveness of dextran generally makes this unnecessary. Examples of the surface active agents which may be used include alkyl ($C_6$—$C_{18}$) sulphates, e. g., sodium lauryl sulfate; the mono- or di-alkyl ($C_6$—$C_{18}$) esters of sulfosuccinic acid such as sodium di-(2- ethylhexyl) sulfosuccinate; the alkyl ($C_3$—$C_{22}$) aryl sulfonates such as sodium dodecyl benzene sulfonate; soluble soaps such as sodium laurate; sulfonated or sulfated amides; partial esters of polyhydric alcohols with higher fatty acids, such as sorbiton monolaurate. Wetting agents of the last-mentioned type are generally preferred. If the wetting agents are used, they may be used in small amounts of the order of 0.01% to about 0.1% by weight.

Foods of all kinds may be provided with a protective dextran or dextran derivative casing or coating in accordance with this invention, including such normally sticky foods as dates, raisins, figs, dried prunes, dried cherries, dried apricots, dried peaches and candied fruits, the surface of the foods being thereby rendered nonsticky and the moist, fresh quality of the fruit being preserved. Other foods which may be coated with or encased in a dextran or dextran derivative film include sausages, hams, bacon, smoked fish, smoked fowl or other meats and meat products; cheese; butter; dried milk in loose powder or compressed form; powdered soups in loose or compressed form; flavorings, spices, teas; candies; eggs; and so on.

Instead of coating the food with the dextran or derivative, or applying a pre-formed film thereto, the dextran or derivative may be applied to paper and other materials commonly used for the wrapping of or as containers and packages for food products for the purpose of preservation and protection thereof.

The following examples will serve to illustrate specific embodiments of the invention, it being understood that these examples are illustrative only and not limitative of the invention.

*Example I*

A hydrolyzed dextran (M. W. between 70,000 and 85,000) is dissolved in water to obtain a solution of high viscosity containing about 5% of the dextran. Sausage obtained by molding a ground mixture of pork meat, pork fat and spices is dipped into the solution, removed therefrom, and dried in a current of air at about 60° C. to obtain sausage having a smooth, glossy, edible protective coating which is strongly adherent and resistant to abrasion.

*Example II*

A whole ham is dipped into a dextran solution as in Example I and then allowed to dry in the air at room temperature. The ham is thus provided with an overall edible film or coating of dextran which protects it against drying out during storage.

*Example III*

Oranges are dipped into an aqueous dispersion of about 3% of a water-dispersible calcium dextranate, removed from the solution and allowed to dry in air. The fruit is thus protected and preserved until the protective coating is removed with the skin when the orange is peeled.

*Example IV*

Sausages as in Example I are dipped into a viscous 5% aqueous solution of a carboxymethyl ether of dextran having a molecular weight between 70,000 and 85,000, and containing an average of about 1-2 carboxymethyl groups per anhydroglucose residue. The sausage is thus provided with an edible, smooth, hygroscopic protective coating which retards loss of moisture by the meat but through which gases evolved during storage of the meat gradually diffuse to the atmosphere.

*Example V*

Dextran of high molecular weight precipitated from the fermented culture medium, dried, purified and reduced to a powder is dispersed in water to obtain a viscous mass containing about 2% of dextran. Whole hams are dipped into the dispersion and dried in air at about 60° C. The hams are thus completely protected and sealed from contamination by a smooth, hard, firmly adherent coating which does not support bacterial or fungus growth.

It will be understood that dextran of varying molecular weight may be used in practicing the invention. Also, the carboxymethyl dextran exemplified may be replaced, in whole or in part, by other dextran ethers, for example, methyl dextran, carboxyethyl dextran, etc. The choice of the ether may be made on the basis of whether or not an edible film is desired. Other alkali metal or alkaline earth metal salts may be substituted for calcium dextranate, notably sodium dextranate.

The casings or coatings of the invention may be printed with various advertising or source legends, trade-marks, etc., and for this purpose there may be used vegetable dyes and coloring materials.

In the claims, the film-forming and coating compositions are referred to as "dispersions." This term is used herein in its broader sense to include both molecular dispersions or true solutions and colloidal dispersions in which the dispersed particles fall within the colloidal range of sizes. Likewise, when the products of the invention are described as food products encased or packaged in dextran or a dextran derivative it is to be understood as including both products enclosed in a pre-formed film or pellicle and those to which the dextran or derivative is applied directly to the food or to a container therefor.

The dextran molecular weights given herein are determined by light-scattering measurements.

Since the foregoing and other variations and modifications may be made in practicing the invention without departing from its spirit and scope, it is to be understood that the invention is not to be limited except as defined in the appended claims.

What is claimed is:

1. The method of providing a food with a protective, cohesive film of dextran which comprises contacting the food with an aqueous medium consisting essentially of an aqueous dispersion of dextran, said dextran being dispersible in water at ordinary temperature and having a molecular weight between 5,000 and that of the native, unhydrolyzed dextran.

2. The method of providing a food with a protective, cohesive film of dextran which comprises contacting the food with an aqueous medium consisting essentially of an aqueous dispersion of native, unhydrolyzed dextran, said dextran being dispersible in water at ordinary temperature.

References Cited in the file of this patent

UNITED STATES PATENTS

| | | |
|---|---|---|
| 2,089,217 | Mahoney | Aug. 10, 1937 |
| 2,203,705 | Stahly et al. | June 11, 1940 |
| 2,229,941 | Stahly et al. | Jan. 28, 1941 |
| 2,337,645 | Cadwell | Dec. 28, 1943 |
| 2,470,281 | Allingham | May 17, 1949 |
| 2,518,135 | Gaver | Aug. 8, 1950 |
| 2,627,466 | Lewis | Feb. 3, 1953 |